(12) United States Patent
Hangleiter

(10) Patent No.: US 8,297,893 B2
(45) Date of Patent: Oct. 30, 2012

(54) METHOD FOR OPERATING AN ACTUATION UNIT AND DEVICE FOR CARRYING OUT SAID METHOD

(75) Inventor: Eugen Hangleiter, Hermaringen (DE)

(73) Assignee: Roehm GmbH, Sontheim (DE)

( * ) Notice: Subject to any disclaimer, the term of this patent is extended or adjusted under 35 U.S.C. 154(b) by 1198 days.

(21) Appl. No.: 12/066,671

(22) PCT Filed: Jun. 14, 2006

(86) PCT No.: PCT/DE2006/001017
§ 371 (c)(1),
(2), (4) Date: Mar. 13, 2008

(87) PCT Pub. No.: WO2007/031046
PCT Pub. Date: Mar. 22, 2007

(65) Prior Publication Data
US 2008/0224423 A1    Sep. 18, 2008

(30) Foreign Application Priority Data

Sep. 13, 2005 (DE) .......................... 10 2005 043 722
Oct. 10, 2005 (DE) .......................... 10 2005 048 800

(51) Int. Cl.
*B23B 31/26* (2006.01)
(52) U.S. Cl. ........ 409/233; 409/131; 279/4.12; 279/134
(58) Field of Classification Search .................. 279/4.1, 279/4.12, 134–135, 146; 409/231–233, 131
See application file for complete search history.

(56) References Cited

U.S. PATENT DOCUMENTS

| 2,835,227 | A |   | 5/1958  | Gamet |
| 3,568,566 | A | * | 3/1971  | Weidig ............................ 409/233 |
| 4,705,440 | A | * | 11/1987 | Babel ............................. 409/233 |
| 7,195,431 | B2| * | 3/2007  | Greif et al. ..................... 409/233 |
| 7,287,940 | B2| * | 10/2007 | Feldmeier et al. ............. 409/233 |

FOREIGN PATENT DOCUMENTS

| DE | 19618610 A1 | * | 11/1996 |
| JP | 56015946 A  | * | 2/1981 |
| JP | 08066809 A  | * | 3/1996 |
| JP | 2002337082 B |  | 11/2002 |

OTHER PUBLICATIONS

EPO website translation of DE 19618610, printed Feb. 24, 2012, three pages.*

* cited by examiner

*Primary Examiner* — Daniel Howell
(74) *Attorney, Agent, or Firm* — Andrew Wilford

(57) ABSTRACT

The invention relates to a method for operating an actuation device (20), which is used to clamp and loosen a clamping device which comprises a tie bolt which can be adjusted in an axial manner in a machine spindle (3), for actuating a clamping head (6) which co-operates with clamping claws (5). Initially, force is exerted upon the tie bolt (4) by means of an actuation device (20) which is used to clamp in an axial clamping direction, until the axial length thereof is fixed in relation to the machine spindle (3) by means of self-locking. According to the invention, after self-locking is obtained, the effect of the force in the direction of clamping of the actuation element (20) on the tie bolt is stopped and remains blocked while the clamping device is being used, and to release clamping, the tie bolt (4) is displaced by the actuation device (20) in the direction of release which is counter to the clamping direction. The invention relates to a device for carrying out said method.

14 Claims, 7 Drawing Sheets

US 8,297,893 B2

METHOD FOR OPERATING AN ACTUATION UNIT AND DEVICE FOR CARRYING OUT SAID METHOD

CROSS REFERENCE TO RELATED APPLICATIONS

This application is the US-national stage of PCT application PCT/DE2006/001017, filed 14 Jun. 2006, published 22 Mar. 2007 as WO2007/031046, and claiming the priority of German patent application 102005043722.2 itself filed 13 Sep. 2005 and PCT patent application PCT/DE2006/001017 itself filed 14 Jun. 2006, whose entire disclosures are herewith incorporated by reference.

FIELD OF THE INVENTION

The invention relates to a method of operating an actuator that is used to clamp and release a chuck having a rod that can be axially displaced in a machine spindle for actuating a clamping head with jaws, and where to start with for clamping a force is initially exerted in an axial clamping direction on the rod by means of the actuator until the axial position of the rod is fixed relative to the machine spindle, and after self-locking is established the application of force in the clamping direction by the actuator on the rod is suspended and remains suspended while the chuck is in operation, and to release the chuck the rod is displaced by the actuator in a release direction that is opposite the clamping direction. The invention further relates to an apparatus for carrying out the method.

BACKGROUND OF THE INVENTION

Chucks are known from the prior art, for example from DE 140 638 A1 [U.S. Pat. No. 6,568,888], that by means of collet chucks are used to clamp workpieces having, for example, a collet. To actuate such chucks, actuators, also referred to as release units, are used that axially displace a rod associated with the chuck, and to clamp the workpiece the rod is pulled in the direction away from the collet chuck and, with application of the necessary clamping force, is held in this position by the actuator, the correct positioning of the rod being assisted by spring-washer assemblies or helical spring washers. The actuator moves the rod in the opposite direction to discontinue the clamping. Although such chucks with associated actuators and the method required for their operation have proven to be successful in practice, the known prior art has limitations when the balance quality must be continually improved as rotation speeds of the spindle increases, and in particular the spring-washer assemblies or helical spring washers have an adverse effect since they bear continuously on the rod.

OBJECT OF THE INVENTION

The object of the present invention, therefore, is to is provide a method of operating an actuator that may be carried out in the absence of such springs. A further object of the invention is to provide an apparatus for carrying out the method.

SUMMARY OF THE INVENTION

The part of the object of the invention relating to the method is attained by use of the above-described method that is characterized in that a force need be exerted on the rod only for clamping and releasing, whereas during operation of the chuck on the machine spindle, which is rotating at high speed, it is not necessary to exert force on the rod.

In order to shorten the resetting time, for example for changing tools, it should be noted that during clamping after self-locking is established it is also possible to reduce the application of force during start-up of the machine spindle; i.e. the machine spindle may already be started, whereas the force transmission from the actuator to the rod has been suspended.

It is also within the scope of the invention, in particular from a safety standpoint, that during release the application of force in the release direction is not commenced until the machine spindle has reached a standstill; i.e. only after the machine spindle has reached a complete standstill is the force transmission chain between the actuator and the rod reestablished, in order to avoid injury or damage as the result of insufficiently clamped workpieces.

The part of the object of the invention relating to the apparatus is attained by the fact that a chuck is provided having a rod that is supported in a machine spindle so as to be axially displaceable in order to actuate a clamping head that cooperates with the jaws, the axial position of the rod in the clamped position having been secured by self-locking, and an actuator is provided that in the self-locked position of the rod is decoupled from it in a positive-fit manner. By use of this design, in particular negative effects on the balance quality caused by the part of the actuator necessary for actuating the rod may be prevented, and in particular so that the connection of the rod to the actuator does not adversely affect the balance quality. These advantages may be realized in a particularly simple manner by positioning the actuator so as not to contact the rod in the clamped position of the rod, i.e. so that the free-standing rod together with the entire machine spindle is able to rotate without contact with the actuating system.

In one advantageous embodiment, the rod has a first wire-wound coil that is provided for interaction with a second wire-wound coil of the machine spindle and coaxial with the first wire-wound coil that is coupled in a contact-free manner with a stator of the stationary actuator housing. In principle, this design forms a linear motor that can move the rod in the clamping direction or the release direction as the result of different current directions.

One very particularly preferred embodiment is characterized in that the rod has an annular collar provided in a piston chamber of a first piston that is located in a cylindrical chamber of the actuator that may be acted on by a pressure medium. In this embodiment, in contrast to the embodiment that makes use of the wire-wound coils, a contact-type operational method of clamping and releasing is allowed, it being ensured that the rod together with its annular collar is positioned without contact with the actuator during operation of the chuck, since this is the key criterion for achieving high rotational speeds with good balance quality, whereas during standstill, contact may be allowed for switching on the chuck.

It is also within the scope of the invention that, starting from a center position, the displacement stroke of the first piston in the cylindrical chamber is greater in both directions than the displacement stroke of the annular collar in the piston chamber in both displacement directions, so that the additional displacement capability of the first piston not only allows contact to be made between the annular collar and the piston chamber, but also allows the necessary displacement of the rod for actuation of the chuck.

It is particularly preferred when a second piston is provided in a second cylindrical chamber in the actuator that bears on the first piston in the clamped position of the rod. For proper functioning of this apparatus it is essential that the annular collar precisely maintains the center position in the piston chamber during operation, this precise positioning being difficult to ensure solely by controlling the pressure conditions in the cylindrical chamber. Use of the second piston easily provides this assurance by establishing in the clamped position the correct position of the first piston and thus the position of the annular collar in its piston chamber.

To establish the correct position of the second piston in the clamped position, the second piston has a larger effective diameter than the first piston, and the opposite sides of the first piston and the second piston in the clamped position of the rod are acted on with equal pressure via a three-way valve.

It is also within the scope of the invention that for stroke control a ring sensor is associated with the actuator for interaction with an indicator associated with the rod, so that this embodiment offers the possibility of monitoring the displacement of the rod for introduction of the clamping force.

A further alternative embodiment is characterized in that the actuator has a rotary feedthrough fitting having a manifold shaft connected to the machine spindle and a rotationally fixed manifold housing that carries pressure medium connections that are used for applying pressure to the two sides of a piston provided in a piston chamber and connected to the rod. In this embodiment it is important that a connection to the rod occurs without contact with the actuator in any operating position during, i.e. clamping, releasing, or during operation, but that in the clamped position the actuator is decoupled from the rod in a positive-fit manner corresponding to the above-described requirements; i.e. the pressure medium connections are acted on by pressure only for switching on, and are switched on for unpressurized operation, since in particular at the desired high rotational speeds of up to 120,000 revolutions per minute the seals are subjected to increased wear under pressure load.

According to a further embodiment, a spindle collar having a circumferential groove is provided on the machine spindle, and at least two diametrically opposite pins engage in the groove for relieving the spindle during clamping and release, the pins being provided on the axially displaceable cylinder wall of the actuator, and two springs acting in the two displacement directions and supported on the housing being associated with the cylinder wall in order to establish a center position of the pins following clamping and release.

Alternatively or additionally, in order to establish a center position of the pins following clamping and release a funnel-shaped surface may be associated with the cylinder wall, and a centering element may be associated with the housing, in the simplest design the centering element being formed by a spring-loaded ball.

However, the centering element may also be formed by a conical pin that may be acted on by a pressure medium.

A further embodiment having two pistons associated with the actuator is characterized in that the first piston serves for with the clamping process and bears on the annular collar during clamping, and a release piston that can be displaced independently of the first piston and that bears on the annular collar during release is provided in the actuator.

BRIEF DESCRIPTION OF THE DRAWING

The invention is explained in greater detail below with reference to the shown embodiments shown in the drawing. Therein.

SPECIFIC DESCRIPTION

Figure 1:
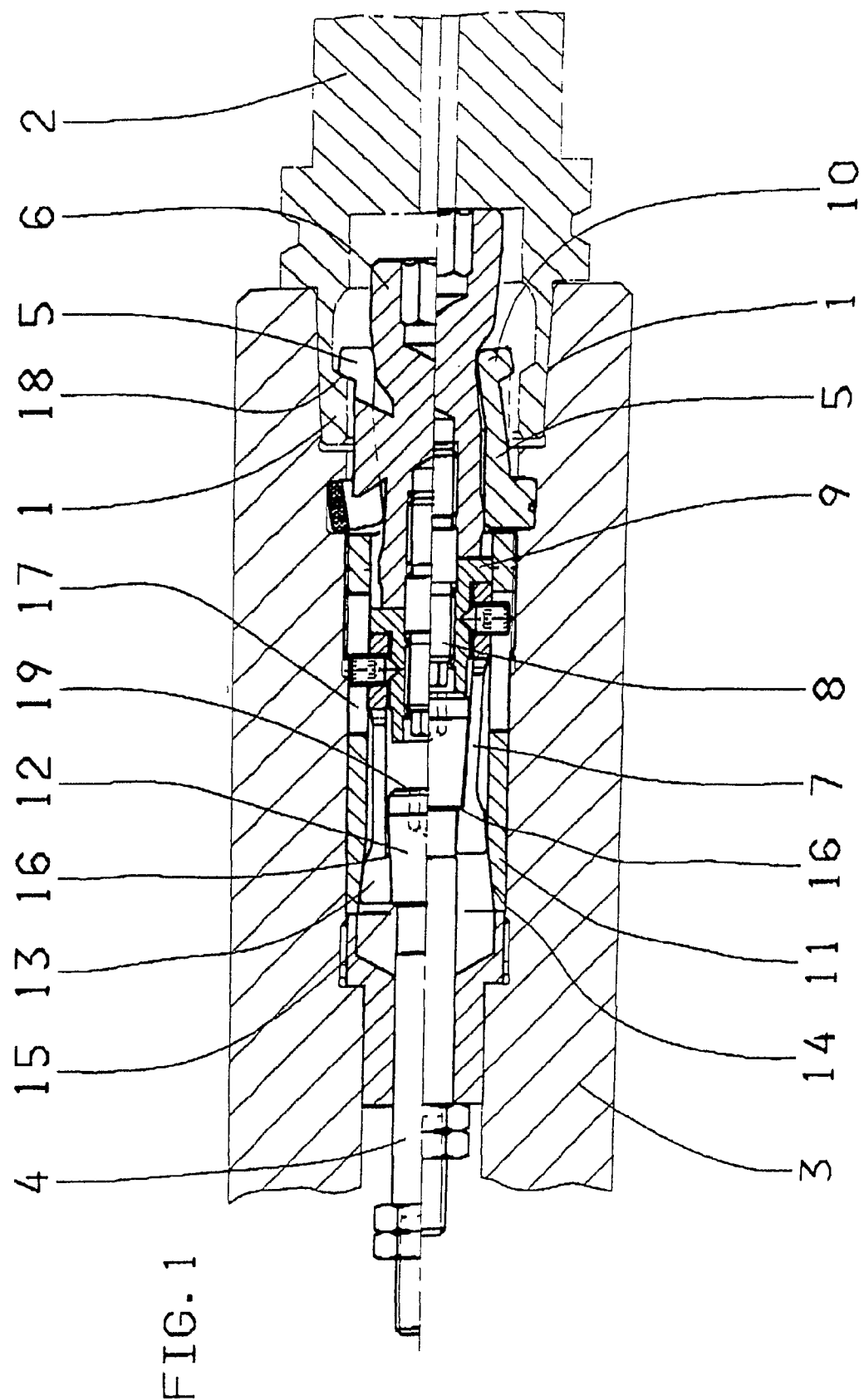
FIG. 1 is a longitudinal section through the chuck to be operated by the actuator.

The drawing shows a chuck used for clamping a workpiece 2 having a collet 1, or for clamping a tool, to which end the chuck has a rod 4 that is supported so as to be axially displaceable in a body 3 and that is provided for actuating a clamping head 6 that cooperates with jaws 5, namely by axial displacement of the rod 4 between a release position shown in the lower half of FIG. 1 and a clamped position shown in the upper half of FIG. 1. The workpiece 2 is clamped by pulling the rod 4 from the release position into the clamped position by means of an actuator 20 shown in the drawing in FIGS. 2 through 4 and to be described in greater detail below; by drawing back jaws 7 and a threaded bolt 8 as well as a threaded ring 9 the clamping head 6 is axially displaced, thereby radially displacing the outer ends 10 of the jaws 5 so as to make contact with the collet 1.

In the chuck shown in FIG. 1, it is noted that a clamping sleeve 11 is provided in the body 3 so as to be axially non-displaceable, the jaws 7 being axially guided in the clamping sleeve and having their inner faces resting against the rod 4, the rod 4 having a conical head 12, and the jaws 7 having a tapered ring 13, and the clamping sleeve 11 having an internal conical surface 14, resulting in self-locking that locks the axial position of the jaw outer ends 7 when the rod 4 moves from the release position to the clamped position, without the actuator 20 having to exert additional tension on the rod 4. The force applied by the actuator 20 through the rod 4 is thus stored, so to speak, by means of this self-locking action, and the secure clamping of the workpiece 2 at its collet 1 is ensured without having to use a tension spring that with its spring force would have to ensure the axial position of the rod 4 with respect to the body 3 or the clamping sleeve 11 in the clamped position. The security of the clamping therefore is not jeopardized by fatigue of the tension spring. In addition, as the result of using self-locking, the rod 4, which is not engaged by a tension spring, is able to rotate with the entire spindle, i.e. the body 3, without having to be connected with its actuator 20, enabling the balance quality to be improved and the rotational speed to be increased.

The drawing also shows that the conical head 12 merges with the rod 4 by a radially extending shoulder 15, and that the jaw outer ends 7 have an inner shoulder 16 for engagement with the shoulder 15, and that the jaw outer ends 7 together with their inner shoulder 16 are able to be spread by the shoulder 15 in the axial region of the conical inner surface 14 of the clamping sleeve 11. In the embodiment shown in the drawing, the conical head 12 has an apex angle of 6°, whereas the conical inner surface 14 of the clamping sleeve 11 has an apex angle of 12°. The inclination of the inner circumferential surface and of the outer circumferential surface of the tapered ring 13 correspond to the inclination of the corresponding contacting components.

The operation of the apparatus is briefly described below. Starting from the release position shown in the lower half of the figure, the actuator 20 exerts a tension on the rod 4 that moves the rod 4 to the left in the drawing. During this displacement, as a result of the contact of the inner shoulder 16 of the jaw outer ends 7 against the shoulder 15 of the rod 4, the rod 4 first entrains the jaw outer ends 7 that to avoid imbalance are guided relative to the clamping sleeve in two elongated holes 17, and by means of the threaded bolt 8, threaded ring 9, and clamping head 6 the jaws 5 with their jaw outer ends 10 pivot radially outward and come to rest against an undercut 18 of the collet 1. The interaction of the shoulder 15 with the inner shoulder 16 results in rapid axial displacement of the clamping head 6, and after traveling a predetermined axial distance the inner shoulder 16 of the jaws 7 is able to disengage from the shoulder 15, and with the inner surface of the tapered ring 13 comes to rest against the conical head 12 while at the same time being pressed with the outer circumferential surface against the tapered ring 13 of the clamping sleeve 11. The jaws 7 are thus carried along in the axial direction only to a slight degree during is continued axial displacement of the rod 4, but with increasing force between the conical head 12 and the clamping sleeve 11 the jaws 7 are wedged until self-locking is attained that provides the established clamping force when the tension from the actuator 20 is no longer applied to the rod 4.

To release the chuck, the rod 4 is moved to the right from the clamped position to the release position, thereby unlocking the jaws 7 from the wedged conical head 12 and the clamping sleeve 11 and also displacing the rod 4 relative to the jaws 7 until the rod's contact surface 19 come to rest against the threaded ring 9, and the inner shoulder 16 is once more able to engage behind the shoulder 15 of the rod 4. Continued movement of the rod 4 displaces the clamping head 6, causing the jaws 5 with their jaw outer ends 10 to release the workpiece 2.

Figure 2:
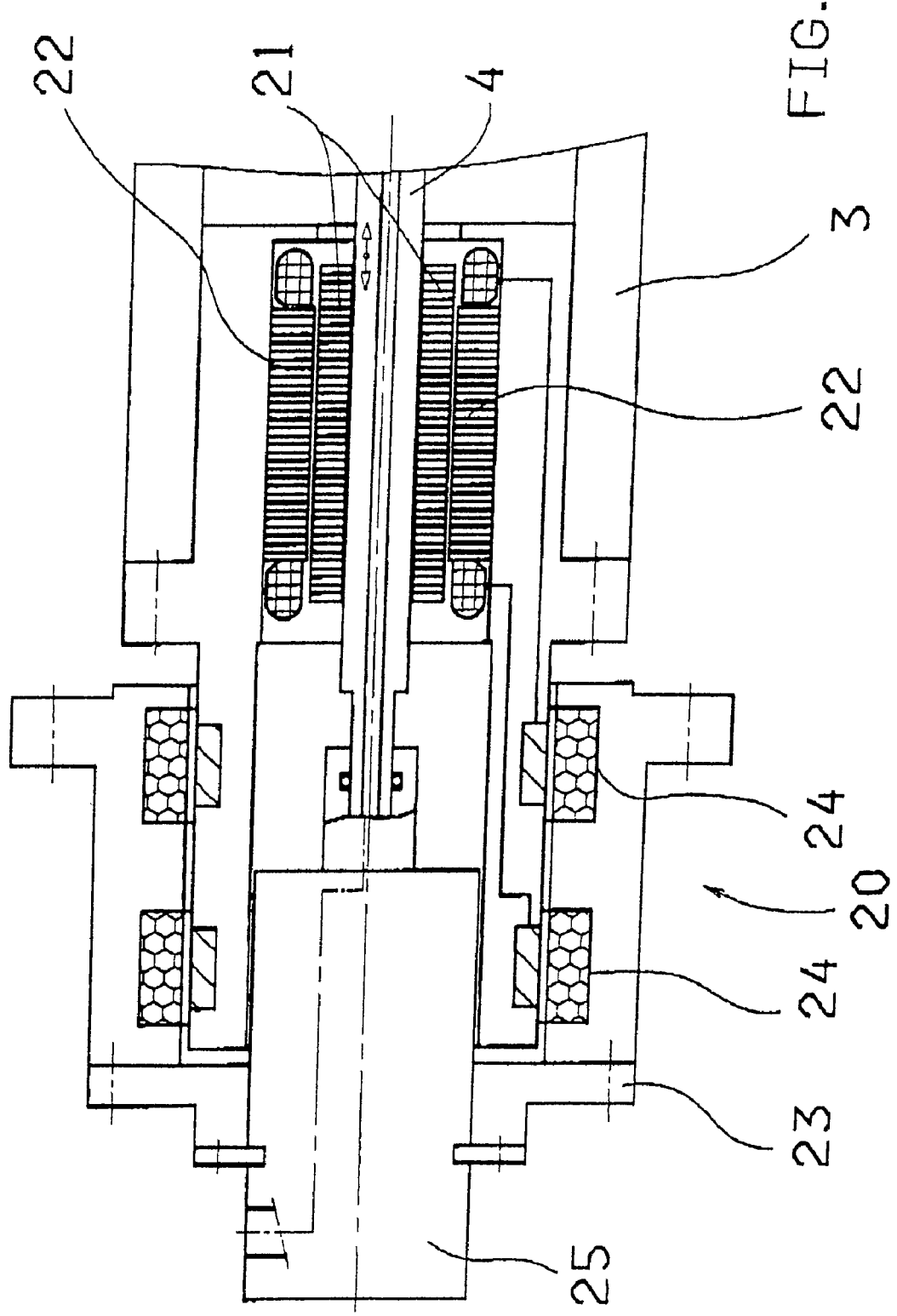
FIG. 2 is a somewhat schematic longitudinal section through a first embodiment of the actuator.
Figure 3:
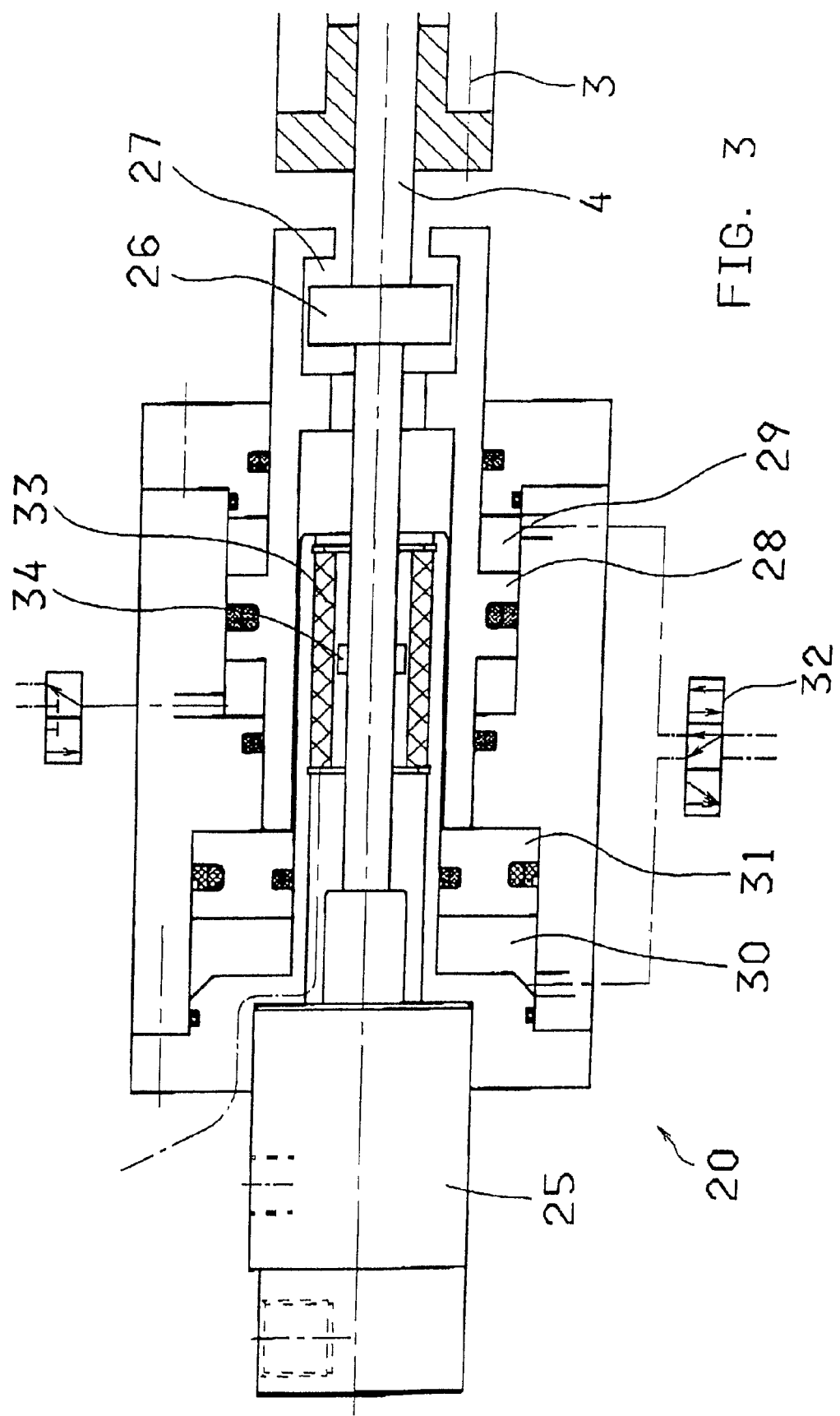
FIG. 3 is a view like FIG. 2 of a second embodiment of the actuator.
Figure 4:
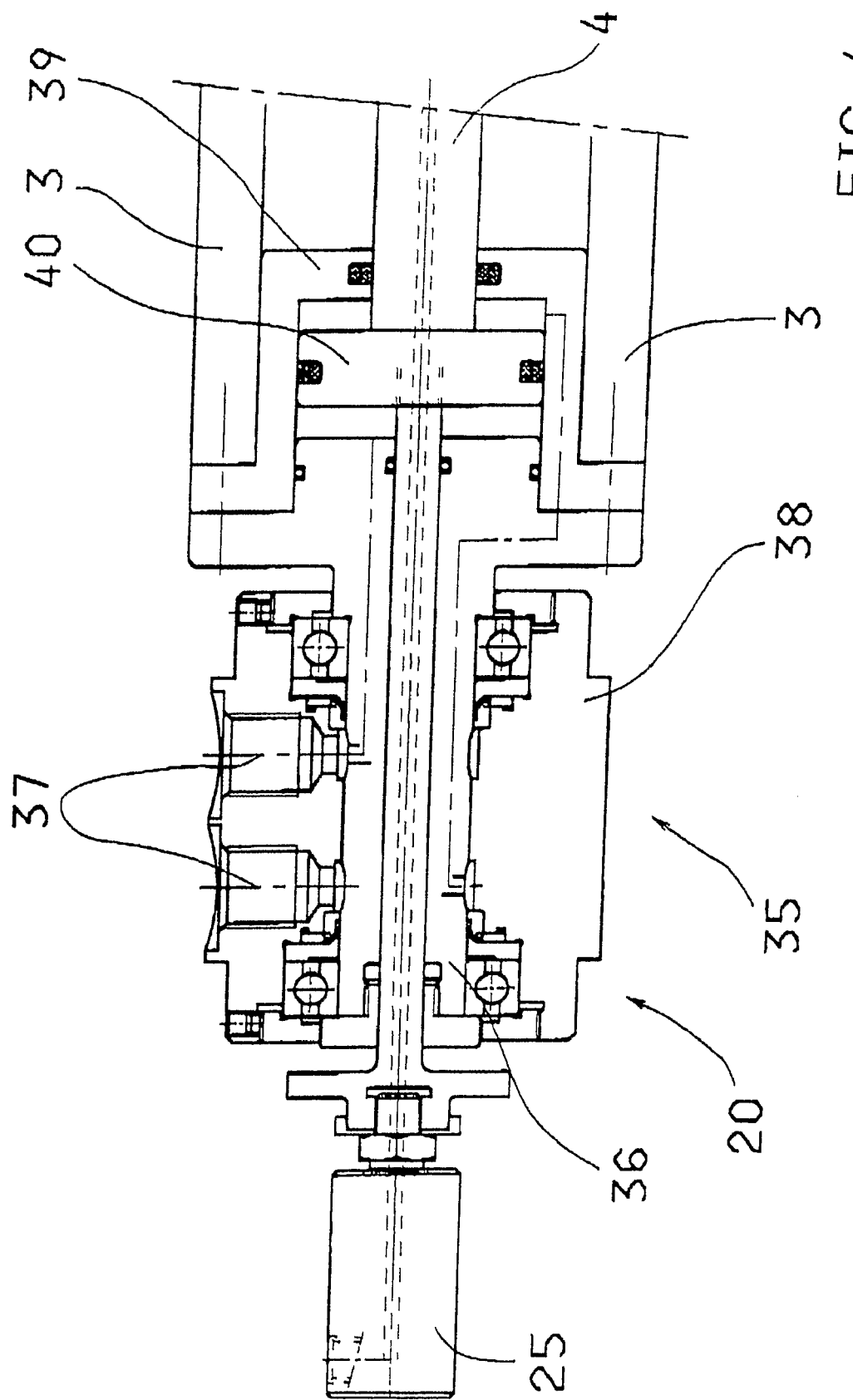
FIG. 4 is a view like FIG. 2, of a further embodiment of the actuator.

The clamping and release of this chuck may optionally be accomplished by use of one of the actuators 20 shown in FIGS. 2 through 4 that are all characterized in that the force transmission chain from the actuator 20 to the rod 4 is interrupted in the clamped position of the rod 4. In the embodiments of FIGS. 2 and 3 this is accomplished by the fact that in the clamped position of the rod 4 the actuators 20 are out of contact with the rod, whereby in the embodiment in FIG. 2, the rod 4 is provided with a first wire-wound coil 21 that is provided for interaction with a second wire-wound coil 22 carried on the machine spindle 3, coaxially surrounding the first wire-wound coil 21, and coupled in a contact-free manner as a stator with the stationary actuator housing 23]. This actuator 20 acts in a contact-free manner on the rod 4 in all operating positions, i.e. for clamping and releasing as well as during operation of the chuck when the latter is rotated together with the machine spindle 3 at high rotational speeds.

FIG. 3 shows an embodiment in which the rod 4 has an annular collar 26 that is provided in a piston chamber 27 of a first piston 28 that is located in a cylindrical chamber 29 of the actuator that may be acted on by a pressure medium, the displacement stroke of the first piston 28 in the cylindrical chamber 29, starting from a center position, being greater in both directions than the displacement stroke of the annular collar 26 in the piston chamber 27 in both displacement directions, so that in addition to the displacement of the first piston 28 for contacting the annular collar 26 with the axial end and back faces of the piston chamber, the continued displacement may force actuation of the clamping head 6. However, to ensure that contact with the end and back faces of the piston chamber 27 is once again released for the annular collar 26 when the rod 4 has assumed its working position after achieving self-locking, a second piston 31 is provided in a second cylindrical chamber 30 in the actuator 20 that acts on the first piston 28 in the clamped position of the rod 4, the second piston 31 having a larger effective diameter than the first piston 28, and the mutually opposing sides of the first piston 28 and the second piston 31 in the clamped position of the rod 4 being acted on with equal pressure via a three-way valve 32, so that the larger effective surface of the second piston 31 ensures contact thereof with the first piston 28, and contact of the second piston 31 with the end face of the second cylindrical chamber 30 is ensured to set the center position of the annular collar 26. In this embodiment, for stroke control a ring sensor 33 is associated with the actuator 20 for interaction with an indicator 34 carried on the rod.

FIG. 4 shows a further embodiment in which the actuator 20 has a rotary feedthrough fitting 35 having a manifold shaft 36 connected to the machine spindle 3 and a rotationally fixed manifold housing 38 that carries pressure medium connections 37, the pressure medium connections 37 being used for applying pressure to the two sides of a piston 40 provided in a chamber 39 and connected to the rod 4, in this embodiment the rod 4 having no contact with the actuator 20 in any operating position, but, rather, the desired interruption of the force transmission chain being provided during operation of the chuck, since after self-locking is established the pressure medium connections 37 may be depressurized.

In all the embodiments in FIGS. 2 through 7, also associated with the actuator 20 at its axial end is a supply device 25 that may be used for supplying air or a coolant for the rod 4 into the chuck.

Figure 5:
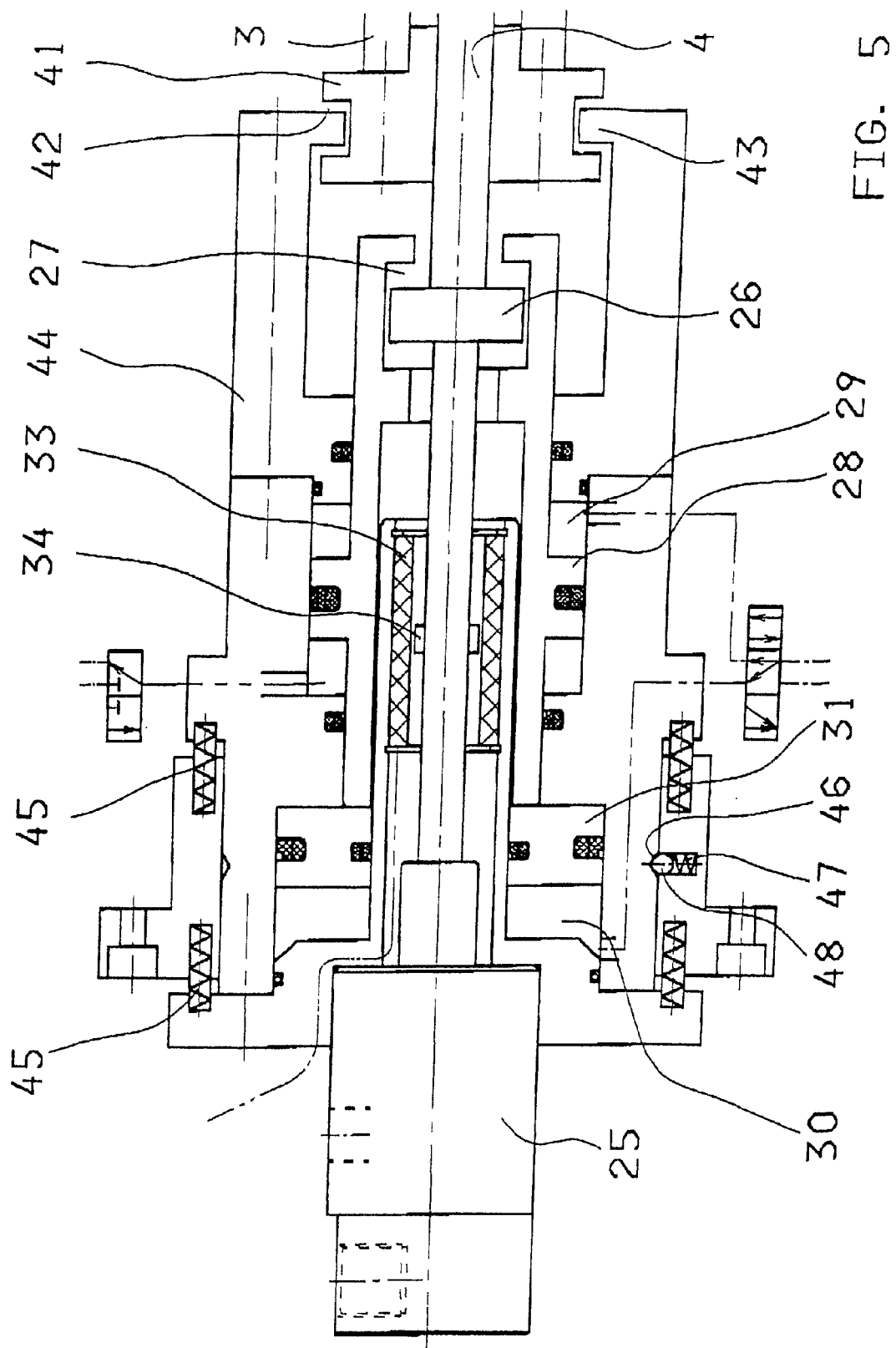
FIG. 5 is a view like FIG. 3 with relief of the spindle.
Figure 6:
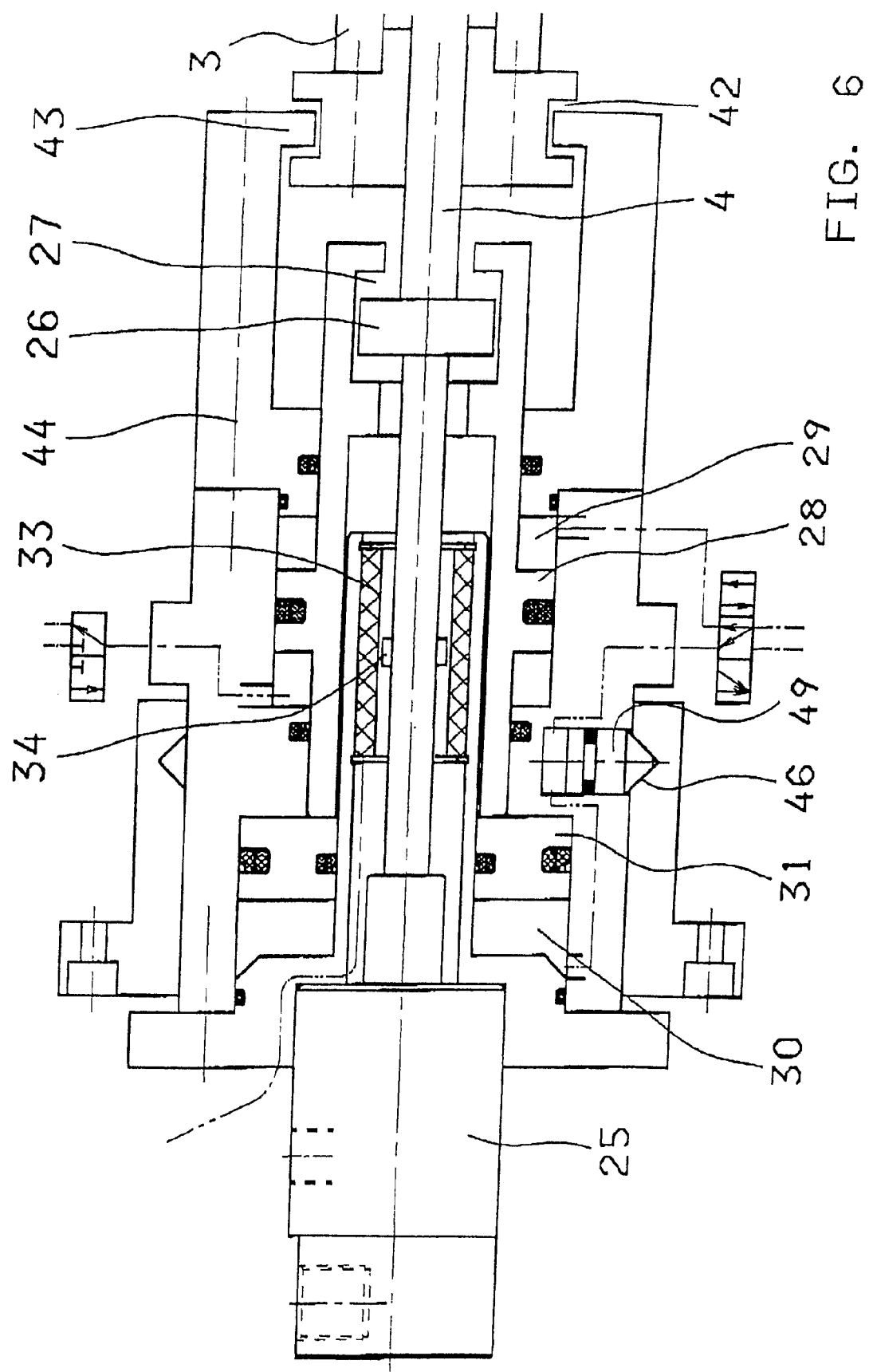
FIG. 6 is a view like FIG. 5, in an alternative embodiment of relief of the spindle.

FIG. 5 shows an embodiment in which a spindle collar 41 having a circumferential groove 42 is provided on the machine spindle 3, and at least two diametrically opposite pins 43 engage in the groove for relieving the spindle during clamping and release, the pins 43 being provided on the axially displaceable cylinder wall 44 of the actuator 20, and two springs 45 acting in the two displacement directions and supported on the housing being provided on the cylinder wall 44 in order to urge the pins 43 into a center position following clamping and release; in contrast, FIG. 6 shows an alternative that may be used for assistance, in which in order to center the pins 43 following clamping and release a funnel-shaped surface 46 is associated with the cylinder wall 44, and a centering element 47 is associated with the housing, the centering element being formed either by a spring-loaded ball 48 (FIG. 5) or by a conical pin 49 that may be acted on by the pressure medium.

Figure 7:
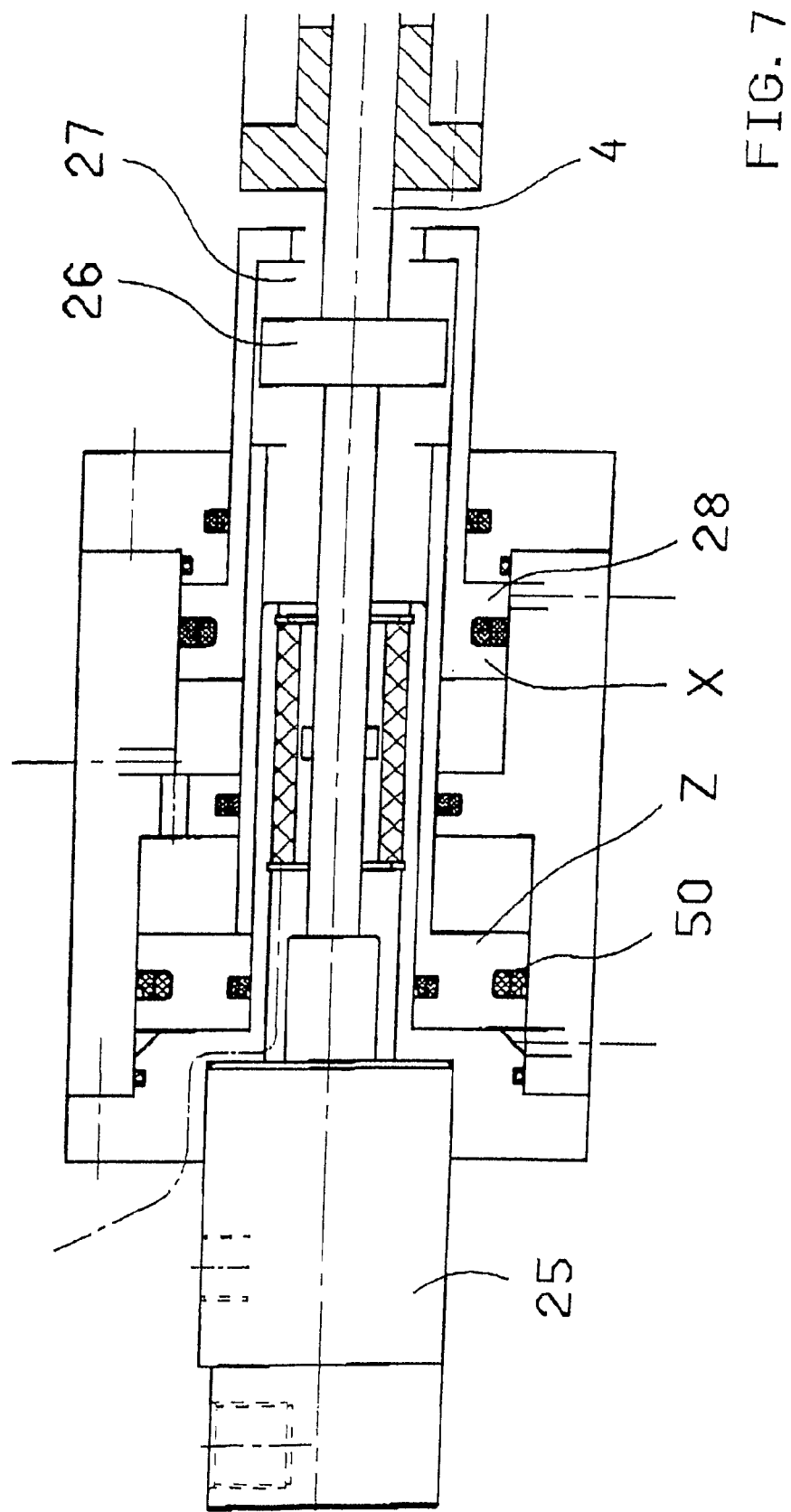
FIG. 7 is a further embodiment of an actuator having two pistons.

Finally, FIG. 7 shows an embodiment in which, although two pistons are associated with the actuator 20, they do not act independently; namely, the first piston 28 is associated with the clamping process and bears on the annular collar 26 during clamping, and a release piston 50 that can be displaced independently of the first piston 28 and that bears on the annular collar 26 during release is provided in the actuator 20.

The invention claimed is:

1. A method of operating an actuator that is used to clamp and release a chuck having a rod that can be axially displaced in a machine spindle for actuating a clamping head that cooperates with jaws, the method comprising the steps of:

for clamping, exerting a force in an axial clamping direction on the rod by means of the actuator until the axial position of the rod is fixed relative to the machine spindle and the jaws grip a tool or workpiece and the jaws and clamping head are axially locked in the spindle;

thereafter suspending application of the force in the clamping direction by the actuator on the rod, thereafter relatively displacing the rod and by the actuator in a release direction that is opposite the clamping direction until the rod is out of axial engagement with and rotationally decoupled from the actuator; and while the rod is out of axial engagement with the actuator, rotating the chuck.

2. The method according to claim 1, further comprising the step of during clamping after self-locking reducing the application of force during start-up of the machine spindle.

3. The method according to claim 1 wherein the application of force in the release direction is commenced after the machine spindle has reached a standstill.

4. In combination with a chuck having a tubular machine spindle extending along an axis;

jaws at an end of the spindle displaceable between an open position allowing a tool or workpiece to be inserted between or removed from between the jaws and a closed position gripping the tool or workpiece; and a rod extending axially in the machine spindle so as to be axially displaceable and carrying a clamping head that cooperates with the jaws, the rod and head being movable between one axial position locking the jaws in the closed position and an axially offset position moving the jaws into the open position, an actuator comprising:

a stationary housing forming a cylinder;

a piston shiftable in the cylinder between end positions and formed with a chamber into which the rod extends;

a collar fixed on the rod in the chamber, the cylinder and chamber being of such relative axial lengths that in one end position of the piston in the cylinder the collar bears axially against one end of the chamber and in the other end position of the piston in the cylinder the collar bears axially against the other end of the chamber; and means for before machining a workpiece, pressurizing the cylinder to move the piston in a clamping direction toward the one end position and thereby engaging the collar against the one end of the chamber and shifting the rod and head into the closed position to grip a workpiece or tool such that the workpiece or tool can be rotated and machined, during machining of the workpiece, pressurizing the cylinder to move the collar in an opposite release direction out of engagement with the ends of the chamber and thereby rotationally decoupling the rod from the actuator, and after machining of the workpiece, pressurizing the cylinder to move the piston in the release direction toward the other end position and thereby engaging the collar against the other end of the chamber and shifting the rod and head into the open position to release the workpiece or tool.

5. The apparatus according to claim 4 wherein, starting from a center position, the displacement stroke of the first piston in the cylindrical chamber is greater in both directions than the displacement stroke of the annular collar in the piston chamber in both displacement directions.

6. The apparatus according to claim 4 wherein a second piston is provided in a second cylindrical chamber in the actuator that bears on the first piston in the clamped position of the rod.

7. The apparatus according to claim 6 wherein the second piston has a larger effective diameter than the first piston, and the mutually opposing sides of the first piston and the second piston in the clamped position of the rod are acted on with equal pressure via a three-way valve.

8. The apparatus according to claim 4 wherein for stroke control a ring sensor is provided on the actuator for interaction with an indicator provided on the rod.

9. The apparatus according to claim 4 wherein a spindle collar having a circumferential groove is provided on the machine spindle, and at least two diametrically opposite pins engage in the groove for relieving the spindle during clamping and release, the pins being provided on the axially displaceable cylinder wall of the actuator.

10. The apparatus according to claim 9 wherein two springs acting in the two displacement directions and supported on the housing are provided on the cylinder wall in order to establish a center position of the pins following clamping and release.

11. The apparatus according to claim 9 wherein a funnel-shaped surface is provided on the cylinder wall, and a centering element is provided on the housing, in order to establish a center position of the pins following clamping and release.

12. The apparatus according to claim 11 wherein the centering element is formed by a spring-loaded ball.

13. The apparatus according to claim 11 wherein the centering element is formed by a conical pin that may be acted on by the pressure medium.

14. The apparatus according to claim 4 wherein the first piston is associated with the clamping process and bears on the annular collar during clamping, and a release piston that can be displaced independently of the first piston and that bears on the annular collar during release is provided in the actuator.

* * * * *